United States Patent [19]

Lawson

[11] 4,033,919

[45] July 5, 1977

[54] DESENSITIZING COMPOSITIONS FOR LITHOGRAPHIC PLATEMAKING AND PRINTING WHICH ARE AQUEOUS SOLUTIONS OF COPOLYMERS OF ACRYLAMIDE WITH A CARBOXYL CONTAINING MONOMER AND A DESENSITIZING ACIDIC ADDITIVE

[75] Inventor: Leslie Edward Lawson, Orpington, England

[73] Assignee: Vickers Limited, London, England

[22] Filed: Jan. 31, 1975

[21] Appl. No.: 546,098

[30] Foreign Application Priority Data

Feb. 4, 1974 United Kingdom ............... 5099/74

[52] U.S. Cl. ............... 260/29.6 TA; 260/29.6 WB; 260/29.6 MP; 260/29.6 H

[51] Int. Cl.[2] ........................................ C08L 33/26

[58] Field of Search ........... 260/29.6 TA, 29.6 WB, 260/29.6 MP, 29.6 H, 80.3 N; 106/2; 101/451, 457

[56] References Cited

UNITED STATES PATENTS

| | | | |
|---|---|---|---|
| 3,373,021 | 3/1968 | Adams et al. | 101/451 |
| 3,560,417 | 2/1971 | Pizzi | 260/29.6 TA |
| 3,619,217 | 11/1971 | West | 106/2 |
| 3,734,873 | 5/1973 | Anderson et al. | 260/29.6 H |
| 3,761,259 | 9/1973 | Arai et al. | 101/457 |
| 3,839,500 | 10/1974 | Dexter | 260/29.6 WB |

OTHER PUBLICATIONS

Merk Index, 5th Ed., Merk & Co., Rahway, NJ, 1940, p. 2.

Coupe, Science of Printing Technology, Cassell, London, pp. 90–95.

*Primary Examiner*—M. J. Welsh

*Attorney, Agent, or Firm*—Reed, Smith, Shaw & McClay

[57] ABSTRACT

A desensitizing composition comprises an aqueous solution comprising (i) a polymer containing structural units derived from acrylamide and from 1% by weight to 25% by weight of structural units containing carboxyl groups and (ii) desensitizing acidic material in an amount such that the pH of the solution is less than 5.5. The carboxyl group containing structural units may be derived from acrylic acid and/or an acrylic acid salt and the desensitizing acidic material may be phosphoric acid. The composition may be used as a substitute for gum arabic solution in lithographic plate making processes and lithographic printing processes.

9 Claims, No Drawings

DESENSITIZING COMPOSITIONS FOR LITHOGRAPHIC PLATEMAKING AND PRINTING WHICH ARE AQUEOUS SOLUTIONS OF COPOLYMERS OF ACRYLAMIDE WITH A CARBOXYL CONTAINING MONOMER AND A DESENSITIZING ACIDIC ADDITIVE

This invention relates to lithographic plate making and printing.

Offset printing employs special formes or masters which are usually known as lithographic plates. A description of these and the process of printing is given in "Offset Lithography" by L. E. Lawson published by Vista Books Limited., London, 1963. The majority of such printing plates require their non-image areas to be moistened with a thin layer of water throughout the printing operation so that they do not accept ink, and the success of the method of printing depends on the ease with which this is achieved. For this reason the material(s) chosen to prepare the non-image areas of a lithographic plate are important, and this invention is concerned with making the non-image areas of such plates hydrophilic and maintaining the non-image areas in a hydrophilic condition during printing.

Commercial printers no longer mix or compound their own processing and printing solutions but rely on the expertise and specialisation of a trade supplier. The supplier has his own problems, one of which is a need to formulate highly concentrated solutions which can be readily transported and diluted to working strength. To do this not only must the formulation be highly effective, it must also be a commercial proposition in terms of the price and commercial availability of its components.

From the beginning of lithography a naturally occurring material known as gum arabic has been widely used as a desensitising colloid to provide hydrophilicity. The colloid is used in the form of an aqueous solution and prevents scumming (smearing) and provides film forming properties. Gum arabic has been used in various ways, e.g. as a desensitising solution during plate processing and as a fountain solution during printing, and with various additives. Normally, when processing clean plates the gum arabic can be used alone. However, in the case where soiled plates are to be treated a mixture of gum arabic and desensitising acid e.g. phosphoric acid is usually used.

Recently there has been a shortage of gum arabic accompanied by a massive increase in price and it is an object of the present invention to provide an alternative material which is less dependent on natural hazards such as droughts, is cheaper to obtain, and is less variable in quality than the naturally occurring gum arabic.

Gum arabic is a polysaccharide which contains both hydroxyl and carboxyl groups. The carboxyl groups have been regarded as being necessary to enable the material to chemically react and adhere to the surface being treated and the hydroxyl groupings have been regarded as being necessary to impart the required degree of water wettability to the treated surface. (In this regard, reference may be made to Science of Printing Technology, London 1966, pages 91 to 94, by R. R. Coupe). Thus it would be expected that successful substitutes for gum arabic should have the same chemical characteristics as gum arabic. However, although the sodium salt of carboxymethyl cellulose, sodium alginate, and ammonium alginate contain both hydroxyl and carboxyl groups none is suitable as a practical substitute for gum arabic. The reason why such materials have not been satisfactory is because they form solutions of high viscosity when a solids content even as low as 5% is present and are thus unsuitable because it is difficult to leave a sufficiently thick uniform layer on the lithographic plate and because it is impossible to provide an adequately concentrated solution for commercial purposes.

Although this viscosity limitation can be avoided in the case of the alginates, a further limitation remains in that it is not possible to sufficiently acidify alginate solutions to provide acidic desensitising plate-etches, or plate-etch concentrates or fountain solutions, without precipitation. Polyacrylic acid has a somewhat similar disadvantage in that it gels when acidified and it also has an unpleasantly strong odour.

It has now surprisingly been found that certain polymers of acrylamide containing carboxyl groups are particularly successful substitutes for gum arabic even though they do not contain hydroxyl groupings. Whereas acrylamide polymers which do not contain carboxyl groups are not satisfactory, polymers of acrylamide which contain a proportion of carboxyl groups are surprisingly suitable in that they provide clear substantially odourless solutions which desensitise well.

Accordingly one aspect of the present invention provides a desensitising composition for use in lithographic plate making and lithographic printing which composition is an aqueous solution comprising (i) a polymer containing structural units derived from acrylamide and from 1% by weight to 25% by weight structural units containing carboxyl groups and (ii) desensitising acidic material in an amount such that the pH of the solution is less than 5.5.

The composition may have a solids content as low as about 0.1% w/v but is preferably in the form of a concentrate having a solids content of up to about 35% w/v for subsequent dilution before use.

The composition of the present invention may be used to desensitise the non-image areas during lithographic printing plate production. Accordingly a further aspect of the present invention provides a process for producing a lithographic printing plate having non-image areas which are water-receptive and ink repellent and image areas which are ink-receptive and water-repellent which comprises the step of desensitising the non-image areas by means of an aqueous solution comprising (i) a polymer comprising structural units derived from acrylamide and from 1% by weight to 25% by weight of structural units containing carboxyl groups and (ii) desensitising acidic material in an amount such that the pH of the solution is less than 5.5, the solution preferably having a solids content of from about 1 to about 20% w/v.

The composition of the present invention may be used as a fountain solution during printing. Accordingly another aspect of the present invention provides a process of printing wherein ink is applied to a lithographic printing plate having non-image areas which are water-receptive and ink-repellent and image-areas which are ink-receptive and water-repellent which process comprises the step of applying to the plate an aqueous solution comprising (i) a polymer comprising structural units derived from acrylamide and from 1% by weight to 25% by weight of structural units containing carboxyl groups and (ii) desensitising acidic material in an amount such that the pH of the solution is less than 5.5, the solution preferably having a solids content of from about 0.1 to about 1.0% w/v.

The carboxyl group containing structural units of the polymer may be units derived from acrylic acid or from an acrylic acid salt. Proprietory examples of suitable polymers are those known as P26 (Cyanamid of Great Britain Ltd) which has a molecular weight of about 200,000 and is a polymer containing about 3.0% by weight of carboxyl group containing structural units derived from acrylic acid and about 18% by weight of carboxyl group containing structural units derived from sodium acrylate, the remaining structural units being derived from acrylamide; and Versicol WN15 (Allied Colloids Ltd) which has a molecular weight of about 140,000 and is a polymer containing about 10% by weight of carboxyl group containing structural units derived from sodium acrylate and about 90% by weight of structural units derived from acrylamide.

The presence of structural units containing carboxyl groups is critical since polymers which contain no such groups such as P250 (cyanamid of Great Britain Ltd.) which is a homopolymer of acrylamide having a molecular weight of 5 to 6 million and W17 (Allied Colloids Ltd) which is a homo-polymer of acrylamide having a molecular weight of about 660,000 are both unsuitable although they may be used in combination with other polymers which are suitable such as P26 and WN15. In addition, high molecular weight polymers such as P250, for example, give solutions which are too viscous.

It is necessary for the polymer to have a relatively low proportion of carboxyl group containing structural units as is the case in the P26 and WN15 polymers since such polymers are remarkably tolerant to the presence of acid.

Mixtures of polymers having the specified structural units can be used. For example a mixture containing equal parts of WN15 and P26 is very suitable. Mixtures containing a polymer having the specified structural units and acrylamide homopolymer can be employed. Additional substances such as other desensitising materials e.g. hydroxy ethyl cellulose; hydroxy acids; compounds of hydroxy acids; alcohols; buffers; corrosion inhibitors; colourants; surfactants; humectants and extenders such as starch can be present in suitable proportions if desired.

Any conventional acidic desensitising material may be used to produce the aqueous solution of the invention and typical examples are phosphoric acid, citric acid, tartaric acid, and gum arabic.

The aqueous solutions of the present invention and used in the processes of the present invention are miscible with the solutions and layers based on natural colloids which are frequently encountered in the lithographic printing industry.

The following Examples illustrate the invention, Examples 2, 4 and 5 being for the purpose of comparison.

In some of these Examples, reference is made to a desensitisation test. This was carried out as follows:- The solution under test was applied to a chemically clean surface (e.g. of aluminum or zinc and which had preferably been grained as is usual in lithography) for 1 minute and was then washed off. The surface was dried and a layer of oleo ink applied. The plate was then immersed in water. The ease and degree with which the ink could be removed from the surface without recourse to an organic solvent was used as a measure of the hydrophilic film forming characteristics of the material under test.

EXAMPLE 1

One half of a clean marble grained zinc lithographic plate was desensitised with a 15% w/v aqueous solution of naturally occurring gum arabic containing 0.25% of phosphoric acid (S.G 1.75) and having a pH of 2.7 and the other half was desensitised with a 15% w/v aqueous solution of the acrylamide polymer P26 (Cyanamid of Great Britain Ltd) also containing 0.25% of phosphoric acid (S.G. 1.75) and of pH 2.7. Both halves were thoroughly washed with clean tap water and the plate was dried. Both halves were found to be similarly well desensitised and unreceptive to greasy ink according to the test given above.

EXAMPLE 2

One half of a clean electrolytically grained aluminum surface was desensitised with a 12.5% w/v aqueous gum arabic solution containing 0.1% phosphoric acid (S.G. 1.75) and having a pH of 3.5 and the other with a 12.5% w/v aqueous solution of the acrylamide homopolymer W17 (Allied Colloids Ltd) also containing 0.1% phosphoric acid (S.G. 1.75) and having a pH of 3.5. After extensive washing with tap water and drying the plate, it was found that, whereas the area that had been treated with the solution containing natural gum arabic was ink repellent when wet, the half that had been treated with the acrylamide polymer solution did not repel the ink when re-wetted.

EXAMPLE 3

Most of the working surface of a clean electrolytrically grained aluminum plate was treated with 5% w/v aqueous solution of acrylamide polymer Versicol WN 15 (Allied Colloids Ltd) to which had been added 1.5% by volume of phosphoric acid (SG 1.75 ) so that the solution had a pH of 1.8. The polymer solution had been conveniently prepared by appropriately diluting a concentrate which was 30% w/v aqueous solution of the polymer. After leaving the acidified solution in contact with the plate for one minute, the plate was well washed with distilled water and dried.

One corner of the surface was not treated in the above manner.

When tested, the untreated area was found to be receptive to black oleo printing ink whilst wetted with water, yet the treated area was completely ink repellent when similarly moistened. After one year there was no indication that the acidified polymer solution was unstable, the solution remaining perfectly clear and free of precipitate or gelation.

EXAMPLE 4

Example 3 was repeated except that the acrylamide homopolymer Versicol W17 (Allied Colloids Ltd) was substituted for the Versicol WN15. The treated area was subsequently found to be much less ink repellent when re-wetted than was the case in Example 3.

EXAMPLE 5

There was made an aqueous solution containing 0.1% by volume of phosphoric acid (SG 1.75) and 10% w/v of A370 (Cyanamid of Great Britain Ltd). A370 is an acrylamide polymer containing a large proportion of carboxyl group containing structural units (about 61% by weight of structural units derived from sodium acrylate and about 0.7% by weight of structural units derived from acrylic acid, the remaining structural units being derived from acrylamide). The solution had a pH of 3.2 and was used to desensitise a gained aluminium surface. When the surface was inked and re-wetted it was observed that the ink was released very readily. In this respect, this acrylamide polymer was satisfactory and similar to the materials employed in Example 1.

When the solution was strongly acidified as in Example 3, the A370 polymer was precipitated whereas the Versicol WN15 polymer used in Example 3 was not.

EXAMPLE 6

Equal volumes of a 15% w/v aqueous solution of Versicol WN15 (Allied Colloids Ltd) and a 15% w/v aqueous solution of natural gum arabic were mixed and acidified by adding 1% (of the final volume) of phosphoric acid. This solution had a pH of 2.0 and was used to successfully clean and desensitise a badly soiled lithographic plate which had been removed from a web-offset press several months earlier, and had been left ungummed.

EXAMPLE 7

A grained and anodised aluminium plate was coated with dichromated gum arabic following which the deep-etch process was carried out in accordance with the published customary practice (G.A.T.F. Lithographers Manual). At the end of the process, the light hardened gum stencil was treated with an aqueous solution comprising 4% w/v acrylamide polymer (Versicol WN15) and 1.5% by vol. phosphoric acid (SG 1.75). The pH of the solution was 1.7. After approximately one minute, the solution had partially softened and destroyed the adhesion of the hardened gum layer, which was removed without difficulty by gentle scrubbing.

The non-image areas of the plate were finally protected by applying a 10% w/v aqueous solution of acrylamide polymer (P26) and wiping this down to form a thin layer prior to drying.

When subsequently placed on a lithographic printing machine, the plate yielded a large number of clean, satisfactory copies without difficulty to the printer.

EXAMPLE 8

The reservoir and damping system of a lithographic printing press was cleaned, and refilled with 0.1% w/v aqueous solution of acrylamide polymer (Versicol WN15) which had been acidified with phosphoric acid to attain a pH of 4.0. The press was fitted with a chromium surfaced bi-metallic lithographic plate, and used in conjunction with the above new fountain solution and normal offset ink and paper to give satisfactory clean copies.

EXAMPLE 9

A Heidelberg KORD lithographic printing press was used to print a business form on bond paper. The design was photographed in the normal manner onto a Marathon photopolymer presensitised plate supplied by the Howson-Algraphy Group of Vickers Limited, and a black ink was employed. The press was charged with the following fountain solution.

| | |
|---|---|
| Acrylamide polymer P 26 | 0.15% by wt. |
| Antarox CO 530 (GAF Great Britain Ltd.) | 0.008% by wt. |

-continued

| | |
|---|---|
| Gum arabic solution (20% w/v) | 0.50% |
| Water, up to | 100% by volume |

Antarox CO530 is a non-ionic surfactant, nonyl phenoxy poly(ethylene oxy) ethanol and the pH of the fountain solution was 5.4.

No difficulty was experienced in obtaining well defined dense black prints throughout the required edition of 30,000 copies.

EXAMPLE 10

Another deep-etch plate was made as in Example 7 and was printed in a press having a damping system which contained the following fountain solution:

| | |
|---|---|
| Acrylamide polymer P26 | 0.25% |
| Hydroxyethyl cellulose (250L-Hercules NV) | 0.1% |
| Ammonium dihydrogen phosphate | 0.15% |
| Distilled water | to 100 |

The pH was 4.5. During an extended printing run, the plate was protected from time to time while the press was stationary by the application of a 10% aqueous solution of the same acrylamide polymer P26 acidified with ammonium hydrogen phosphate to pH 4.5. Eventually 100,000 copies were obtained.

I claim:

1. A desensitising composition for use in lithographic plate making and lithographic printing which composition is an aqueous solution comprising (i) a polymer of acrylamide containing from 1% by weight to 25% by weight of structural units containing carboxyl groups and (ii) acidic desensitising material in an amount such that the pH of the solution is less than 5.5.

2. A composition according to claim 1, in which the aqueous solution has a solids content of 0.1 to 20% w/v.

3. A composition according to claim 1, in which the aqueous solution has a solids content of up to 35% w/v for subsequent dilution for use in lithographic platemaking or lithographic printing.

4. A composition as claimed in claim 1 wherein the carboxyl group containing structural units of the polymer are derived from a substance selected from the group consisting of acrylic acid, an acrylic acid salt, and mixtures thereof.

5. A composition as claimed in claim 2 wherein the polymer has a molecular weight of about 140,000 and contains 10% by weight of carboxyl group containing structural units derived from sodium acrylate, the remaining structural units being derived from acrylamide.

6. A composition as claimed in claim 2 wherein the polymer has a molecular weight of about 200,000 and contains 3% by weight of carboxyl group containing structural units derived from acrylic acid and 18% by weight of carboxyl group containing structural units derived from sodium acrylate, the remaining structural units being derived from acrylamide.

7. A composition as claimed in claim 2 wherein said polymer is a mixture of a polymer which has a molecular weight of about 140,000 and which contains 10% by weight of carboxyl group containing structural units derived from sodium acrylate, the remaining structural units being derived from acrylamide and of a polymer which has a molecular weight of about 200,000 and which contains 3% by weight of carboxyl group containing structural units derived from acrylic acid and 18% by weight of carboxyl group containing structural units derived from sodium acrylate, the remaining structural units being derived from acrylamide.

8. A composition as claimed in claim 1 wherein the desensitising acidic material is phosphoric acid.

9. A composition as claimed in claim 1 wherein the aqueous solution has a solids content of from 0.1 to 35% w/v.

* * * * *